June 24, 1930.                F. C. BLANCHARD                1,766,702
                                  LUBRICATOR
                               Filed Feb. 8, 1929
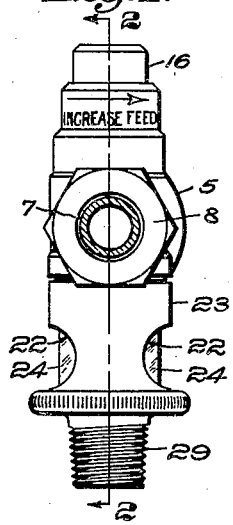
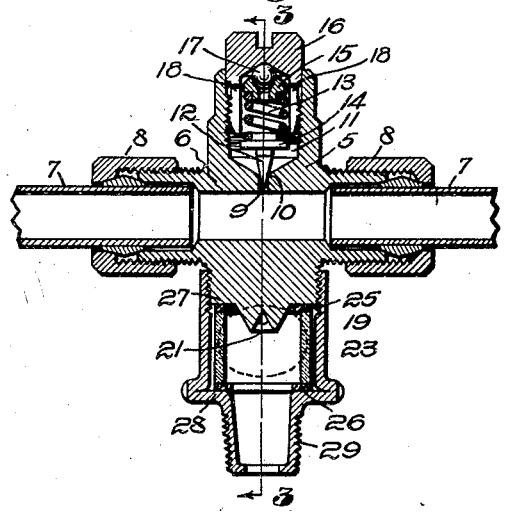
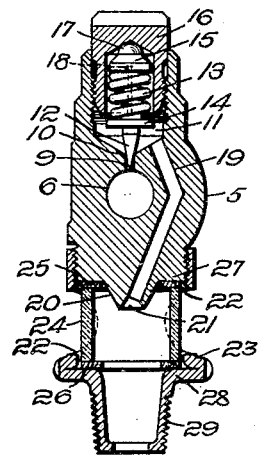
Inventor:
Frederick C. Blanchard Patented June 24, 1930

1,766,702

UNITED STATES PATENT OFFICE

FREDERICK C. BLANCHARD, OF DORCHESTER, MASSACHUSETTS

LUBRICATOR

Application filed February 8, 1929. Serial No. 338,547.

This invention relates to a novel and improved lubricator for use in connection with lubricating systems, in which pulsations of pressure open and close the valves of the lubricators at the various bearings to be lubricated.

The invention will be best understood by reference to the following description, when taken in connection with the accompanying drawings of one specific embodiment thereof, while its scope will be more particularly pointed out in the appended claims.

In the drawings:

Fig. 1 is an elevation of a lubricator exemplifying the invention;

Fig. 2 is a sectional view on line 2—2 of Fig. 1; and

Fig. 3 is a sectional view on line 3—3 of Fig. 2.

Referring to the drawings, and to the embodiment of the invention which is illustrated therein, there is shown a lubricator or feeder comprising a body or casing 5, provided with a supply passage 6 intended to be connected with the source which supplies oil to one or more feeders. In the present example, the passage 6 is a through passage, as the upper feeder shown is intended to be interposed between and to connect two pipe sections 7, herein attached to the body by unions 8. When, however, the feeder is to be a dead-end feeder, the supply passage will not extend entirely through the casing or body. Above the passage 6, there is a small, upwardly-directed passage 9, and a valve seat 10, and above the latter is a chamber 11 for a needle valve 12, normally resting on the valve seat and closing the passage 9. This valve is suitably constructed and arranged to respond to a predetermined pressure in the system, as by being loaded with a spring 13, whose lower end rests against an abutment 14 on the valve, and whose upper end rests against a movable abutment 15, which is adjustable vertically by a hollow screw 16, threaded into the chamber 11. A steel ball 17, interposed between the abutment 15 and the screw 16 is provided to insure that the pressure of the spring shall be brought as nearly axial as possible with the valve. The rate of feed is increased by turning the screw in the direction of an arrow indicated in Fig. 1, stamped on the valve body and associated with the words "Increase feed" also stamped on the valve body. Adjustment of this screw varies the load of the spring imposed upon the needle valve, and hence varies the amount of oil fed with each pulsation of pressure. To prevent the adjustment of the screw from being disturbed accidentally, the screw in the present example is provided with one or more, herein two, slots 18 to cause the same to engage the thread in the valve body with spring pressure. In preparing the screw for insertion in the valve body, the threaded portion is first spread a little by inserting a tool in the slots.

When the valve opens, oil is admitted from the passage 6 through the passage 9 into the chamber 11 thereabove, whence it descends by a lateral passage 19 to a nozzle 20, presenting an outlet 21. The rate of feed is readily observable through openings 22 in a casing 23, which is threaded onto the valve casing and holds a glass tube 24, whose upper and lower ends are seated against upper and lower compressible washers 25 and 26, held under compression against abutments 27 and 28 presented by the casings 5 and 25, respectively. The casing 23 presents a nipple 29, to be screwed into an appropriate opening in or adjacent the bearing to be lubricated.

In the operation of the feeder, the jump of the needle valve overcomes any tendency of the oil to form a film over the feeding opening. The opening 9, being above the column of oil in the supply passage 6, safeguards the former from the entrance of foreign matter, which might be in the piping system. In this manner, grit or dirt of any sort is harmlessly carried past the feeder.

Having thus described one embodiment of the invention, but without limiting myself thereto, what I claim and desire by Letters Patent to secure is:

1. In a lubricator for pulsating systems, the combination of a casing having a supply passage, a chamber above said supply passage, a passage leading from said supply passage upwardly to said chamber, and a passage leading from said chamber in a downward direction to an outlet; a normally closed, upwardly opening valve disposed within said chamber and normally closing communication between the second-mentioned passage and said chamber; and a spring normally maintaining said valve in its closed position and adapted to yield under the pressure within said supply passage and to permit oil to flow from said supply passage upwardly through the second-mentioned passage into said chamber and thence through the third-mentioned passage to said outlet.

2. In a lubricator for pulsating systems, the combination of a casing having a supply passage, a chamber above said supply passage, a passage leading from said supply passage upwardly to said chamber, and a passage leading from said chamber in a downward direction to an outlet; a normally closed, upwardly opening valve disposed within said chamber and normally closing communication between the second-mentioned passage and said chamber; a spring normally maintaining said valve in its closed position and adapted to yield under the pressure within said supply passage and to permit oil to flow from said supply passage upwardly through the second-mentioned passage into said chamber and thence through the third-mentioned passage to said outlet; and means for adjustably loading said spring to vary the degrees of resistance presented by said valve to upward displacement of the same under the influence of the pressure in said supply passage.

3. In a lubricator for pulsating systems, the combination of a casing having a supply passage, a chamber above said supply passage, a passage leading from said supply passage upwardly to said chamber, and a passage leading in a downward direction to an outlet; a normally closed, upwardly opening valve disposed within said chamber and normally closing communication between the second-mentioned passage and said chamber; a spring normally maintaining said valve in its closed position and adapted to yield under the pressure within said supply passage and to permit oil to flow from said supply passage upwardly through the second-mentioned passage into said chamber and thence through the third-mentioned passage to said outlet; and an imperforate cap closing the upper part of said chamber and having screw-threaded engagement with said casing, said cap constituting a variable loading means for said spring.

4. In a lubricator for pulsating systems, the combination of a casing having a supply passage, a chamber above said supply passage, a passage leading from said supply passage upwardly to said chamber, and a passage leading in a downward direction to an outlet, a normally closed, upwardly opening valve disposed within said chamber and normally closing communication between the second-mentioned passage and said chamber; a spring normally maintaining said valve in its closed position and adapted to yield under the pressure within said supply passage and to permit oil to flow from said supply passage upwardly through the second-mentioned passage into said chamber and thence through the third-mentioned passage to said outlet; an imperforate cap closing the upper part of said chamber and having screw-threaded engagement with said casing, said cap constituting a variable loading means for said spring; and an abutment for the upper end of said spring interposed between the latter and said cap.

5. In a lubricator for pulsating systems, the combination of a casing having a supply passage, a chamber above said supply passage, a passage leading from said supply passage upwardly to said chamber, and a passage leading in a downward direction to an outlet; a normally closed, upwardly opening valve disposed within said chamber and normally closing communication between the second-mentioned passage and said chamber; a spring normally maintaining said valve in its closed position and adapted to yield under the pressure within said supply passage and to permit oil to flow from said supply passage upwardly through the second-mentioned passage into said chamber and thence through the third-mentioned passage to said outlet; an imperforate cap closing the upper part of said chamber and having screw-threaded engagement with said casing, said cap constituting a variable loading means for said spring, an abutment for the upper end of said spring; and a universal joint between said abutment and said cap.

6. In a lubricator for pulsating systems, the combination of a casing having a supply passage; a chamber above said supply passage, a passage leading from said supply passage upwardly to said chamber, and a passage leading in a downward direction to an outlet; a normally closed, upwardly-opening valve disposed within said chamber and normally closing communication between the second-mentioned passage and said chamber; and an imperforate cap closing the upper part of said chamber and having screw-threaded engagement with said casing.

In testimony whereof, I have signed my name to this specification.

FREDERICK C. BLANCHARD.